US010053030B2

(12) United States Patent
Vyas

(10) Patent No.: US 10,053,030 B2
(45) Date of Patent: Aug. 21, 2018

(54) ELECTRICAL SYSTEM FOR AN AIRCRAFT

(71) Applicant: ROLLS-ROYCE PLC, London (GB)

(72) Inventor: Parag Vyas, Nottingham (GB)

(73) Assignee: ROLLS-ROYCE plc, London (GB)

( * ) Notice: Subject to any disclaimer, the term of this patent is extended or adjusted under 35 U.S.C. 154(b) by 1031 days.

(21) Appl. No.: 14/069,881

(22) Filed: Nov. 1, 2013

(65) Prior Publication Data

US 2014/0333126 A1 Nov. 13, 2014

(30) Foreign Application Priority Data

Nov. 6, 2012 (GB) .................................. 1219925.3

(51) Int. Cl.
B64D 47/00 (2006.01)
B60R 16/03 (2006.01)
H02J 3/46 (2006.01)
H02J 4/00 (2006.01)

(52) U.S. Cl.
CPC ................ B60R 16/03 (2013.01); H02J 3/46 (2013.01); H02J 4/00 (2013.01); *B64D 2221/00* (2013.01)

(58) Field of Classification Search
CPC ...... B60R 16/03; B64D 221/00; B64D 47/00; H02J 4/00; H02J 5/00; H02J 3/46
USPC .......................................... 307/9.1, 10.1, 11
See application file for complete search history.

(56) References Cited

U.S. PATENT DOCUMENTS

| 4,761,726 A | 8/1988 | Brown | |
| 5,764,502 A * | 6/1998 | Morgan | H02J 4/00 307/66 |
| 6,037,752 A | 3/2000 | Glennon | |
| 7,112,944 B1 | 9/2006 | Kojori | |
| 2004/0129835 A1* | 7/2004 | Atkey | B64D 13/06 244/118.5 |
| 2006/0061213 A1 | 3/2006 | Michalko | |
| 2008/0211237 A1* | 9/2008 | Berenger | H02J 3/12 290/40 B |
| 2009/0015063 A1 | 1/2009 | Michalko | |
| 2009/0127855 A1* | 5/2009 | Shander | H02J 4/00 290/7 |
| 2009/0326737 A1* | 12/2009 | Derouineau | B64D 13/06 701/3 |
| 2010/0193630 A1* | 8/2010 | Duces | H02J 3/02 244/58 |
| 2011/0254368 A1* | 10/2011 | Boe | B63H 21/17 307/18 |
| 2011/0273012 A1* | 11/2011 | Tardy | H02J 1/102 307/9.1 |

(Continued)

OTHER PUBLICATIONS

Mar. 1, 2013 British Search Report issued in British Application No. GB1219925.3.

(Continued)

*Primary Examiner* — Rexford Barnie
*Assistant Examiner* — Terrence Willoughby
(74) *Attorney, Agent, or Firm* — Oliff PLC

(57) ABSTRACT

This invention relates to an electrical system for an aircraft, comprising: a first main generator connected to at least one load via a first bus; a second main generator connected to at least one load via a second bus; a first and a second auxiliary generator associated with the first and second buses, the auxiliary generators being driven by a common prime mover.

12 Claims, 3 Drawing Sheets

(56) References Cited

U.S. PATENT DOCUMENTS

| | | | |
|---|---|---|---|
| 2012/0248866 A1* | 10/2012 | Takeuchi | B60L 1/003 307/9.1 |
| 2013/0015703 A1* | 1/2013 | Rouse | H02J 3/38 307/18 |
| 2014/0008488 A1* | 1/2014 | Buzzard | B64D 41/00 244/50 |
| 2014/0032002 A1* | 1/2014 | Iwashima | G05B 13/02 700/295 |
| 2014/0197681 A1* | 7/2014 | Iwashima | B60R 16/03 307/9.1 |

OTHER PUBLICATIONS

Dec. 5, 2017 Search Report issued in European Patent Application No. 13005197.2.

\* cited by examiner

ELECTRICAL SYSTEM FOR AN AIRCRAFT

TECHNICAL FIELD OF INVENTION

This invention relates to an electrical system in the form of an electrical architecture or network for application in the aerospace industry. In particular, the invention relates to an electrical network for an aircraft having multiple electrical power sources which are electrically connected to provide power for a variety of loads.

BACKGROUND OF INVENTION

FIG. 1 shows a conventional ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

In current gas turbine engines, electrical power is typically generated by a wound field synchronous generator 44, although it will be appreciated that other electrical machines could be used subject to reliability and electrical performance requirements. The generator 44 is driven via a mechanical drive train 46 which includes an angle drive shaft 48, a step aside gearbox 50 and a radial drive 52 which is coupled to the intermediate pressure spool shaft 40 via a geared arrangement. Thus, due to the choice of generator 44 and transmission 46, the rotational speed of the generator's rotor and the electrical frequency which is outputted into the electrical system of the aircraft is proportional to the speed of the engine. It will be appreciated that other arrangements are possible, including the use of constant speed drives which help provide a fixed frequency electrical supply.

The electrical power provided by the engines supplies the various loads of the airframe and gas turbine engines themselves. These loads typically increase in size with each new generation of civil aircraft to the point where the electrical loading on current aircraft and aircraft in development accounts for a significant portion of the fuel consumption.

The present invention seeks to improve the known electrical architectures used in conventional airframes to increase the overall efficiency of an aircraft.

STATEMENTS OF INVENTION

The present invention provides an electrical system for an aircraft, comprising: a first main generator connected to at least one load via a first bus system; a second main generator connected to at least one load via a second bus system; a first and a second auxiliary generator respectively associated with the first and second bus systems, the auxiliary generators being driven by a common prime mover and further comprising electrical conditioning equipment arranged to alter the electrical output of one of the auxiliary generators to substantially match one of the main generators.

Providing the arrangement of the present invention allows more flexibility in the connectivity of the electrical power sources of the aircraft which can lead to an increase in the generating efficiency of system and aircraft as a whole.

The electrical outputs of both auxiliary generators may be connectable to the same electrical conditioning equipment.

The electrical system may further comprise at least two electrical conditioning units, one for each auxiliary generator.

Each of the bus systems may include a main generator bus and an auxiliary generator bus.

The second bus may be a DC bus.

The electrical system may include a back to back AC-to-AC convertor having a DC link, wherein the DC bus connected to the DC link.

The back to back convertor may include a bidirectional unit through which power can be passed from the DC bus to the first bus, and the first bus to the DC bus.

The first and second bus may be electrically isolated during normal use.

The electrical system may include switchable links between the first bus and the loads, and the second bus and the loads.

The electrical system may include a controller which is configured to connect only one of either the first or second bus at any one time.

DESCRIPTION OF DRAWINGS

Embodiments of the invention will now be described with the aid of the following drawings of which.

DETAILED DESCRIPTION OF INVENTION

Figure 1:
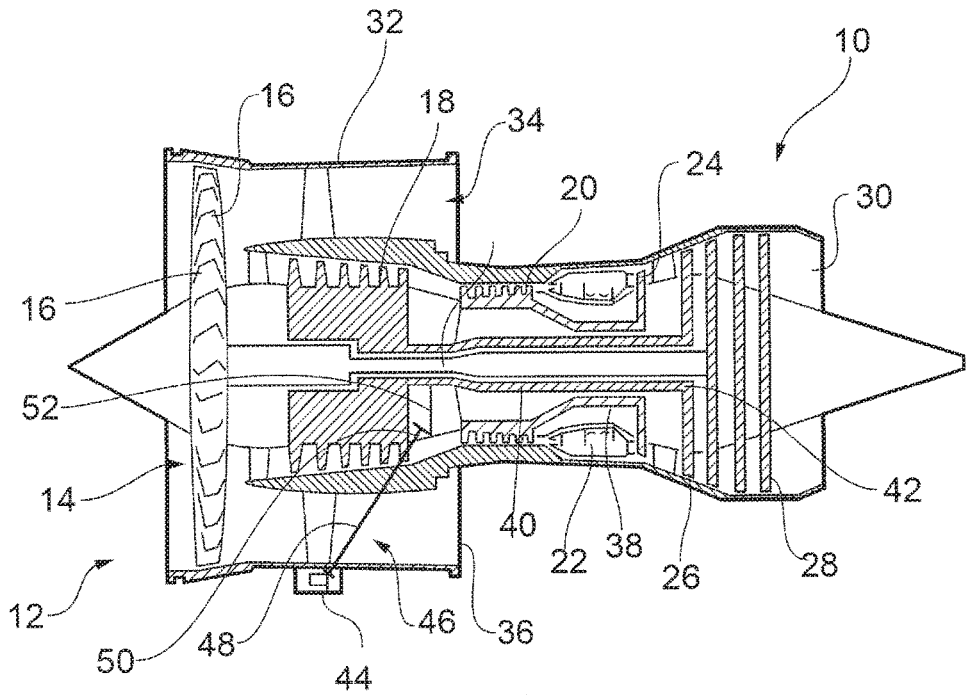
FIG. 1 shows a known gas turbine engine arrangement.
Figure 2:
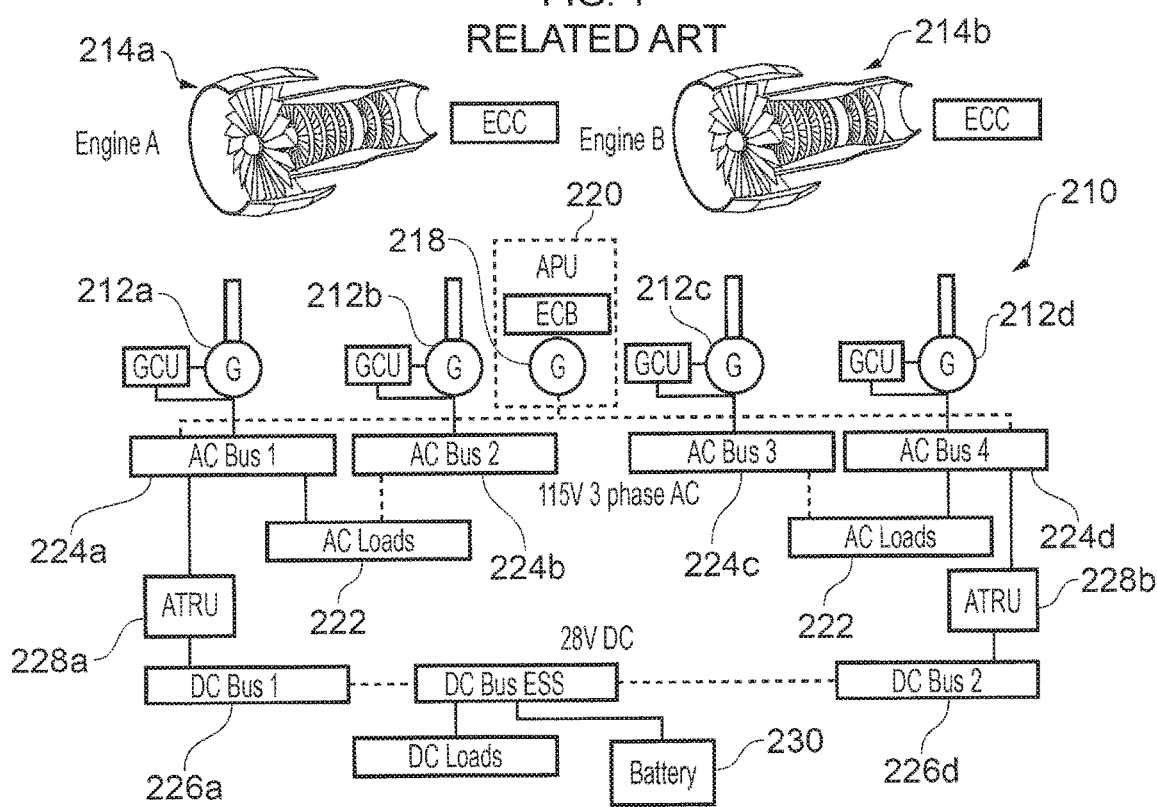
FIG. 2 shows a known electrical network for an aircraft.

FIG. 2 shows a known electrical network 210 for an airframe. The electrical network 210 includes four electrical generators 212 a-d, which are driven by prime movers in the form of power take-offs taken from gas turbine engines 214a, b. Each engine 214a, b drives two of the generators 212 a-d, each from the same spool of the engine 214a, b in a similar configuration to that described in FIG. 1 for the single generator 44. Thus, each of the two generators 212 a-d shown on the left hand side of FIG. 1 are connected to one of the high pressure or intermediate pressure spools of one engine, and the two generators on the right hand side to the corresponding spool of another engine 214a, b.

The arrangement includes a further generator 218 which is driven by a prime mover in the form of an auxiliary power unit, APU 220. The APU 220 is typically a small gas turbine but may be other forms of power source such as a reciprocating engine or fuel cell, for example. More than one other auxiliary generator 218 may be included in other embodiments. Conventionally, the APU is used to provide power when the main generators cannot do so, either due to a failure or because the engines are not operated to supply secondary power, for example, when the aircraft is on the ground.

The main engine generators 212a-d are connected to respective bus systems 224a-d, 228a,b which are electrically isolated from one another during normal use and which feed various loads 222, 223. The electrical isolation between the buses avoids the problem of electrical synchronisation of the generator outputs 212 a-d which are typically at different electrical frequencies for a number of reasons.

The electrical buses are in the form of alternating current, AC, buses 224a-d and direct current, DC, buses 226a, b which are fed by some form of rectifier, which, in the described embodiment, is an auto transformer rectifying unit 228a-b. The voltages of the buses 224a-d, 228a,b are generally determined by the demands of the equipment it supplies but would typically be 115 or 230V AC and 28 or 270 or +/−270V DC. A second auxiliary power source in the form of battery 230 is also connected to the DC network. This is typically used to provide power in emergencies to the 28 VDC loads, which include the flight deck loads.

The AC 224a-d and DC 228a,b buses are respectively interconnectable via appropriate switch gear (not shown) such that power can be diverted from one generator 212a-d to any other one of the buses. Thus, in the event of a generator 212a-d fault or engine 214a, b failure for example, power can still be supplied by one or more of the other generators 212a-d to the electrical loads 222.

The APU 220 is also interconnectable to each of the AC buses 224a-d to provide additional redundancy and to provide ground power and starting capability for the engines 214a, b which are typically started using electrical machines which rotate the engine spools. There is no direct electrical connection between the DC bus 228a,b and APU 220.

Figure 3:
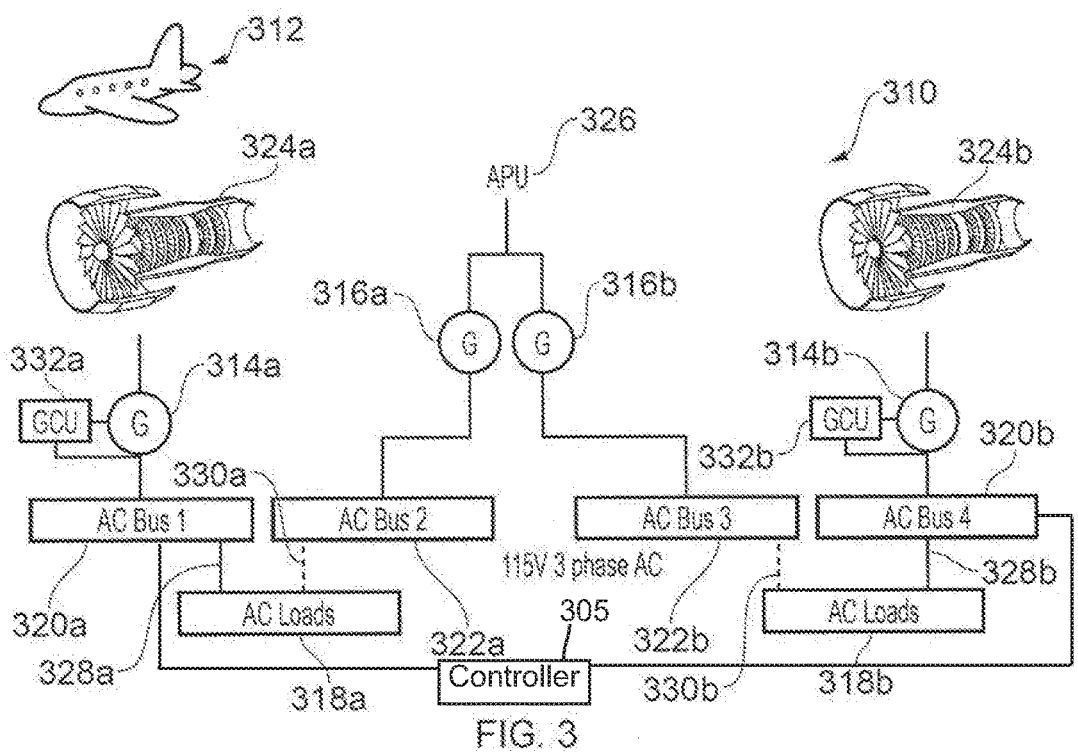
FIG. 3 shows a electrical network according to the present invention.

FIG. 3 shows an electrical network 310 for an aircraft 312 according to the present invention. The electrical network 310 includes a plurality of electrical power sources in the form of generators 314a,b and 316a,b, various loads 318a,b and connecting electrical infrastructure in the form of the electrical bus systems which include sub-buses 320a,b 322a, b. It will be appreciated that the network 310 may be larger or smaller than that depicted in FIG. 3 which shows only one generator per engine 324a,b. For example, there may be multiple engines having multiple generators each, similar to the system shown in FIG. 2.

The first electrical power sources are two main electrical generators 314a,b which are driveably connected to a spool of a propulsive gas turbine engine 324a,b similar to the one described in relation to FIG. 1 above. The main generators 324a,b may be any suitable type which meets the requirements of the system but is conventionally a wound field synchronous machine which outputs variable frequency, AC electrical power into the network 310.

The second electrical power sources are auxiliary generators 316a,b which are part of an APU 326 as are known in the art. An APU 326 will typically take the form of a gas turbine engine located within the main airframe of the aircraft 312 and operates separately from the main propulsive engines 324 of the aircraft, conventionally for providing power when the main generators 314a,b are not in operation for some reason. The two electrical generators 316a,b are driven by the APU prime mover at substantially the same speed and so have a similar output frequency.

The electrical power sources 314a,b, 316a,b provide electrical power to the various loads 318a,b which are distributed throughout the aircraft 312 and engines 314. The loads 318a,b vary in specification and include primarily AC 334 equipment of sizes which typically range from a few milliwatts to a hundred kilowatts or more, but also include DC loads in some instances.

The electrical loads 318a,b are connected to the power sources through the AC buses 320a,b, 322a,b which form part of a larger bus system which is associated each load or groups of loads and which provide an electrical pathway for power flow. In the described embodiment, the buses 320a,b 322a,b are electrically isolated from one another in normal use which allows the electrical output of the two main generators 314a,b to be exclusive from one another. As mentioned above, this avoids the need to frequency and phase match the electrical outputs of the power sources making the system far simpler. However, it will be appreciated that there may be a need to interconnect the AC buses 320a,b 322a,b if one of the electrical supplies fails for some reason, allowing the loads to be supplied by the other generator.

Thus, the electrical network is arranged into two branches, each having a number of loads 318a,b, a main generator 314a,b and an auxiliary generator 316a,b. The two auxiliary generators 316a,b of the APU 326 are each connected to one of the AC buses 322a,b so as to provide auxiliary power to that bus 322a,b alone, with the main generators 324a,b being connected to different buses 320a,b, where the buses 324a,b, 320a,b in each branch form a bus system associated with the loads.

The connection between each of the buses 320a,b, 322a,b for the main 314a,b and auxiliary 316a,b generators and the common loads 318a,b is via a respective switchable link 328a,b, 330a,b. The switchable links 328a,b, 330a,b are independently operable such that the connection between the generators 314a,b, 316a,b can be prevented but power can be supplied by either of a main generator 314a,b of an auxiliary generators 316a,b as required.

The switching functionality is provided by conventional means in the form of electrical isolators or circuit breakers (not shown) which can be operated as required. The switching regime and configuration management may be controlled centrally by any suitable system such as an Electronic Engine Controller 305 which is part of the aircraft Full Authority Digital Engine Control (FADEC) system and which communicates with the Engine Power Management System, none of which are shown but which are well known in the art. The purpose of the control system is to generally monitor the required power and the operating condition of the main engines to ensure the power demand is being met. Where it is not, the control system interfaces with the main generators via a generator control unit, GCU, 332a,b. Where the electrical power cannot be provided by the main generators 314a,b for some reason, the control system can be arranged to reconfigure the electrical network 310 so as to provide power from the associated auxiliary generator 316a, b.

Thus, in normal use, only one of the main 314a,b or auxiliary 316a,b generators is ever connected to each load set 318a,b such that the synchronising of the two supplies is not needed. This is particularly advantageous in the case where two auxiliary generators 316a,b are used as it allows means that the frequency outputted by each the of auxiliary generators 316a,b does not need to be matched to the main generators 314a,b which means both can be used in simultaneously to supply the two branches of the electrical network 310. It will be appreciated that the connection of the different electrical supplies may need to overlap slightly in practice to provide a seamless transfer between the two supplies from the viewpoint of the electrical loads so some synchronisation may be required, or energy storage used to bridge the supply gap required for a switch over which maintains the isolation.

When operating, the demand required by the electrical loads 318a,b in the network is assessed by the control system and a determination made as to how the power is to be supplied from the main 314a,b and auxiliary 316a,b generators, with the necessary configuration being realised with the switchable links 328a,b, 330a,b. The assessment may be based on the capability of the main generators 314a,b to provide the power as determined by the operational state of the engines, or may involve an assessment of the potential for power sharing of the electrical loads between the main or auxiliary generators to help increase efficiency in the aircraft. That is, there may be portions of a flight cycle in which there is a net efficiency benefit for the aircraft 312 in providing power from the APU 326 rather than the gas turbine engine 324a,b.

Hence, the arrangement allows the required power to be shared between the main generator and auxiliary generator during normal operating conditions where there may be a perceived efficiency benefit, or where there is a fault and critical loads are supplied by the remaining generator.

Figure 4:
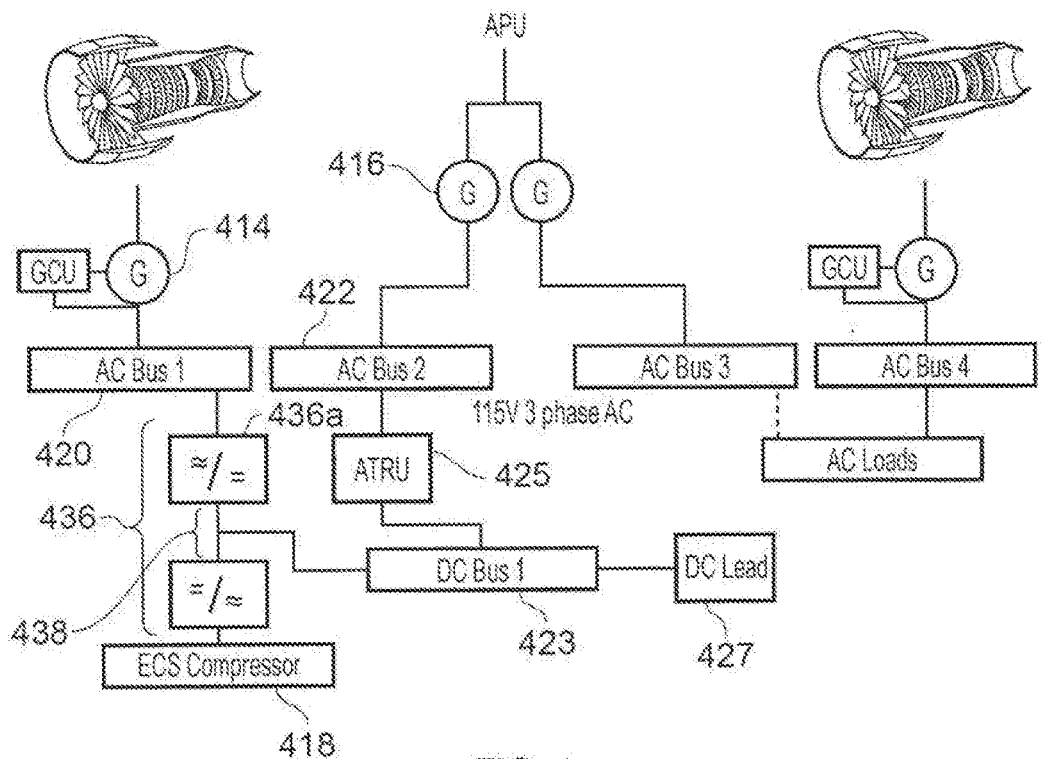
FIG. 4 shows a modified electrical network having a convertor fed load.

FIG. 4 shows a modified electrical network 410 with two branches, each having at least one main 414 and one auxiliary 416 generator connected to specific loads via an electrical bus system 420, 422. The load in this case is one of many potential loads on an aircraft and is an Environmental Conditioning System Compressor 418, ECSC, which conventionally requires around several hundred kilowatts, and is one of the largest loads in the aircraft 312.

The ECSC 418 is connected to the main generator's electrical bus 420 via an electrical conditioning unit in the form of a back to back AC convertor 436 which includes a DC link 438. The convertor 436 receives electrical power from the main generator's AC bus 420 and converts the variable frequency, variable voltage power into a form suitable for use by the load 430. This requirement will be application specific but will likely be a constant voltage, constant frequency supply.

The electrical supply provided by the auxiliary generator 416 is connected to the ECS compressor 436 via a DC bus system 423 which is connected to the DC link 438 of the convertor 436. The DC bus 423 receives power through an Auto Transformer Rectifying Unit 425, ATRU, which converts the AC power outputted by the auxiliary generator 416 into a DC voltage within a specific range.

This embodiment is particularly advantageous as it allows the DC loads 427 to be supplied by either of the main generator 414 or auxiliary generator 416, either independently or simultaneously, without having to synchronise the direct outputs of main 414 and auxiliary 416 generators. Further, in the case where the first stage of the back to back converter 436a is bidirectional, the DC voltage provided by the auxiliary generator 416 through the DC bus 423 can be converted into AC and the power used to supply other AC loads (not shown). A yet further advantage is that the equipment required to handle the DC is largely present on the aircraft 312 to help provide power to the ECSC load 418 so the additional infrastructure required to supply the extended functionality from the auxiliary generator 416 is limited.

Although the embodiment of FIG. 4 shows the connection of the auxiliary generator 416 via the DC link 438 of the convertor, it will be possible to make the connection in other ways.

The above described embodiments implement an APU having two electrical generators which output current having a substantially similar frequency due to the common drive. Hence, if the APU is driven such that the electrical output of one of the auxiliary generators matches the electrical frequency of one of the buses, the other will not match its respective bus because the two main generators are purposely driven at different speeds. Hence, the embodiments above implement independent buses and mutually exclusive load sharing between the main and auxiliary generators to remove the problem of synchronising the supplies.

Figure 5:
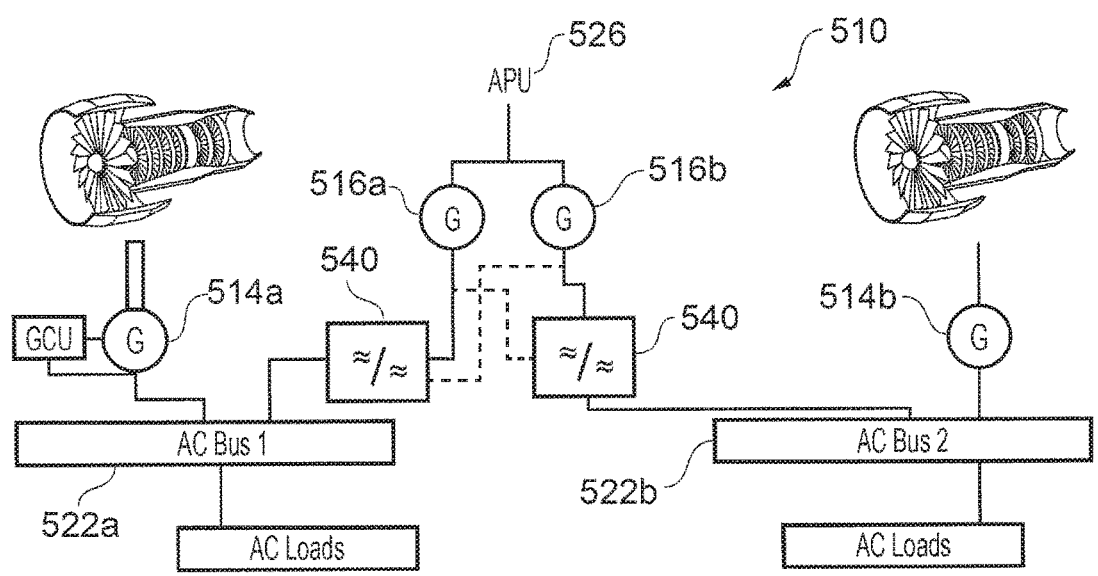
FIG. 5 shows an alternative electrical network according to the invention.

In another embodiment, the synchronisation issue is addressed by providing the connection between one of the auxiliary generators 516b and its respective electrical bus 522b with an inverter 540 which is arranged to match the electrical output of the auxiliary generator 516b to the bus 522b as shown in FIG. 5. This enables the output frequency of the auxiliary generator 516b to be matched to a bus 522 which is common to a main generator 514b.

Control of the other auxiliary generator 516a can be achieved by adapting the rotational speed of the prime mover of the APU 526 such that the output frequency is matched to its respective main generator 514a. In this way, the auxiliary 516a and main 514a generators can also be connected to a common bus 522a. Hence, both of the generators 514a, 516a can be used simultaneously for each branch of the electrical network 510.

In some embodiments, the outputs of both auxiliary generators 516a,b will be via an electrical conditioning unit 540 to regulate the supply such that either generator 516a,b can be used with either bus 522a,b. This will help provide some redundancy in the network.

In yet further embodiments, there may be one electrical conditioning unit 540 which is connectable to both of the auxiliary generators 516a,b. In this case, either the inverter or regulation of the drive could be used to control the output frequency of an auxiliary generator when only one is required. If both are required, then one of the auxiliary generator outputs would be conditioned by the inverter 540, with the other being controlled by adjusting the rotor speed with the APU prime mover. This is particularly advantageous as it potentially allows the auxiliary generators to be used together to provide power to a particular branch of the network or individual load. Further, the auxiliary generators 516a,b could be different sizes with a primary auxiliary generator being of a larger rating with the output being controlled by the prime mover, and a secondary, smaller auxiliary generator, in which the output is conditioned by the inverter. This may also allow the inverter to be a lower rating and weight.

It will be appreciated that the above embodiments are exemplary only and should not be taken to restrict the spirit and scope of the invention. Further, the examples are not necessarily exclusive of one another and some of the described features may be applicable to all embodiments.

The invention claimed is:

1. An electrical system for an aircraft, comprising:
a first alternating current main generator connected to at least one load via an alternating current first bus system;
a second alternating current main generator connected to at least one load via an alternating current second bus system;

a first auxiliary generator selectively connectable to the first bus system;

a second auxiliary generator selectively connectable to the second bus system, the first and the second auxiliary generators being simultaneously driven by a common prime mover; and an electrical conditioning unit selectively connectable between the first or the second auxiliary generator and the first and the second bus system and arranged to alter an electrical frequency and phase of the first or the second auxiliary generator to substantially match the frequency and phase of the alternating current of one of the first or second alternating current main generators and the respective alternating current first or second bus systems, wherein the first and second bus systems are electrically isolated during normal use such that the first alternating current main generator and the first auxiliary generator are electrically isolated from the second alternating current main generator and the second auxiliary generator during normal use.

2. An electrical system as claimed in claim 1, wherein the electrical frequency and phase of both of the first and the second auxiliary generators are connectable to the same electrical conditioning equipment.

3. An electrical system as claimed in claim 1, further comprising at least two electrical conditioning units, one for each of the first and the second auxiliary generators.

4. An electrical system as claimed in claim 1, wherein each of the first and the second bus systems includes a main generator bus and an auxiliary generator bus, the first and second alternating current main generators providing power to the main generator alone of the respective first and second bus systems, and the first and second auxiliary generators providing power to the auxiliary bus alone of the respective first and second bus systems.

5. An electrical system as claimed in claim 1, further comprising: a DC bus.

6. An electrical system as claimed in claim 5, further comprising a back to back AC-to-AC convertor having a DC link, wherein the DC bus is connected to the DC link.

7. An electrical system as claimed in claim 6, wherein the back to back AC-to-AC convertor includes a bidirectional unit through which power can be passed from the DC bus to the first bus system, and the first bus system to the DC bus.

8. An electrical system as claimed in claim 1, further comprising switchable links between the first bus system and the loads, and the second bus system and the loads.

9. An electrical system as claimed in claim 8, further comprising a controller which is configured to connect only one of either the first or the second bus systems to electrical loads at any one time.

10. An electrical system as claimed in claim 1, wherein the electrical conditioning unit is a convertor for converting an alternating current input to an alternating current output.

11. An electrical system as claimed in claim 1, wherein the electrical conditioning unit is a convertor and the convertor is a back to back AC-to-AC convertor.

12. An electrical system for an aircraft, comprising:

a first alternating current main generator connected to at least one load via an alternating current first bus system;

a second alternating current main generator connected to at least one load via an alternating current second bus system;

a first auxiliary generator selectively connectable to the first bus system;

a second auxiliary generator selectively connectable to the second bus system, the first and the second auxiliary generators being simultaneously driven by a common prime mover; and an electrical conditioning unit selectively connectable between the first or the second auxiliary generator and the first and the second bus system and arranged to alter an electrical frequency and phase of the first or the second auxiliary generator to substantially match the frequency and phase of the alternating current of one of the first or second alternating current main generators and the respective alternating current first or second bus systems, wherein each of the first and the second bus systems includes a main generator bus and an auxiliary generator bus, the first and second alternating current main generators providing power to the main generator alone of the respective first and second bus systems, and the first and second auxiliary generators providing power to the auxiliary bus alone of the respective first and second bus systems.

\* \* \* \* \*